United States Patent
Park et al.

(10) Patent No.: US 12,479,266 B2
(45) Date of Patent: Nov. 25, 2025

(54) AIR CONDITIONER FOR VEHICLE

(71) Applicant: Hanon Systems, Daejeon (KR)

(72) Inventors: Tae Yeong Park, Daejeon (KR); Chan Joo Maeng, Daejeon (KR); Ji Ho Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 664 days.

(21) Appl. No.: 17/791,266

(22) PCT Filed: Jan. 15, 2021

(86) PCT No.: PCT/KR2021/000574
§ 371 (c)(1),
(2) Date: Jul. 7, 2022

(87) PCT Pub. No.: WO2021/145712
PCT Pub. Date: Jul. 22, 2021

(65) Prior Publication Data
US 2023/0347711 A1    Nov. 2, 2023

(30) Foreign Application Priority Data

Jan. 17, 2020  (KR) .......................... 10-2020-0006403
Jan. 13, 2021  (KR) .......................... 10-2021-0004457

(51) Int. Cl.
*B60H 1/00* (2006.01)
(52) U.S. Cl.
CPC ................ *B60H 1/00671* (2013.01)
(58) Field of Classification Search
USPC .................................................. 454/69–165
See application file for complete search history.

(56) References Cited

U.S. PATENT DOCUMENTS

| | | | | |
|---|---|---|---|---|
| 6,347,987 B1 * | 2/2002 | Ichishi | ................... | B60H 1/247 |
| | | | | 454/153 |
| 6,607,029 B2 * | 8/2003 | Danieau | ............. | B60H 1/00671 |
| | | | | 454/126 |

(Continued)

FOREIGN PATENT DOCUMENTS

| | | |
|---|---|---|
| JP | 2016182835 A | 10/2016 |
| KR | 20100137793 A | 12/2010 |

(Continued)

OTHER PUBLICATIONS

International Search Report issued in PCT/KR2021/000574 on Apr. 6, 2021.

*Primary Examiner* — Ko-Wei Lin
(74) *Attorney, Agent, or Firm* — NORTON ROSE FULBRIGHT US LLP

(57) ABSTRACT

A vehicle air conditioning device includes an air conditioning case having a plurality of air discharge ports, a cooling heat exchanger and a heating heat exchanger sequentially formed in an air flow path of the air conditioning case, wherein the air discharge ports each have a face vent composed of the center vent and the side vents, a left-right temperature difference reduction means for reducing the temperature difference between a discharge port of the center vent and discharge ports of the side vents by reducing, in a first air conditioning mode, the cross-sectional area of the flow path through which air is discharged to the center vent, and by reducing, in a second air conditioning mode, the cross-sectional area of the flow path through which air is discharged to the side vents.

13 Claims, 11 Drawing Sheets

(56) References Cited

U.S. PATENT DOCUMENTS

| | | | | |
|---|---|---|---|---|
| 9,163,848 B2* | 10/2015 | Doll | ............... | B60H 1/3414 |
| 9,266,406 B2* | 2/2016 | Morikawa | ............ | B60H 3/0085 |
| 9,513,027 B2* | 12/2016 | Londiche | ............. | C21D 9/0087 |
| 2004/0018812 A1* | 1/2004 | Tanoi | ................ | B60H 1/00664 |
| | | | | 454/121 |
| 2005/0130580 A1* | 6/2005 | Butera | ............... | B60H 1/00842 |
| | | | | 454/121 |
| 2007/0107892 A1* | 5/2007 | Sato | .................. | B60H 1/00035 |
| | | | | 454/145 |
| 2009/0049853 A1 | 2/2009 | Araki et al. | | |
| 2017/0232815 A1* | 8/2017 | Deneau | ............... | B60H 1/3421 |
| | | | | 454/155 |
| 2019/0152289 A1* | 5/2019 | Chen | ................ | B60H 1/00064 |
| 2019/0308488 A1* | 10/2019 | Nava | ................ | B60H 1/00692 |
| 2019/0322152 A1* | 10/2019 | Pinger | ....................... | B60S 1/54 |
| 2020/0039322 A1* | 2/2020 | Soto Infante | ...... | B60H 1/00871 |
| 2020/0298660 A1* | 9/2020 | Cho | .................... | F04D 17/105 |
| 2023/0347711 A1* | 11/2023 | Park | ................ | B60H 1/00064 |

FOREIGN PATENT DOCUMENTS

| | | |
|---|---|---|
| KR | 20110003756 A | 1/2011 |
| KR | 20140083370 A | 7/2014 |

* cited by examiner

PRIOR ART

PRIOR ART

AIR CONDITIONER FOR VEHICLE

CROSS REFERENCE TO RELATED APPLICATIONS

This application is a national phase under 35 U.S.C. § 371 of International Application No. PCT/KR2021/000574 filed on Jan. 15, 2021, which claims the benefit of priority from Korean Patent Application Nos. 10-2020-0006403 filed on Jan. 17, 2020 and 10-2021-0004457 filed on Jan. 13, 2021. The entire contents of these applications are incorporated herein by reference in their entirety.

TECHNICAL FIELD

The present invention relates to an air conditioner for a vehicle and, more specifically, to an air conditioner for a vehicle, which has a center vent blowing air toward the center of a passenger and a side vent blowing air toward the side.

BACKGROUND ART

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for a cooling action and a heater core for a heating action inside an air-conditioning case, and selectively blows the air cooled by the evaporator or heated by the heater core toward parts of the interior of the vehicle.

Especially, in order to secure defogging performance and maintain a high-performance heating during heating, a two-layer air conditioner has been developed. In order to defrost windshields while driving with heat in winter, cold outdoor air with low humidity is effective, but it causes drop of indoor temperature.

The two-layer air conditioner substantializes a two-layer air flow of indoor air and outdoor air by supplying outdoor air to the upper part of the vehicle and by circulating indoor air to the lower part of the vehicle, so as to effectively defrost using fresh outdoor air with low humidity supplied to the upper part and to maintain high-performance heating by providing fresh outdoor air to passengers and providing warm indoor air to the lower part.

FIG. 1 is a cross-sectional view of a conventional two-layer air conditioner for a vehicle. Referring to FIG. 1, the two-layer air conditioner for a vehicle includes an air conditioning case 10, an evaporator 2, and a heater core 3.

The air conditioning case 10 has an air flow path of a predetermined shape formed therein and a plurality of air discharge ports formed at an exit. The air flow path is divided into an upper flow path 5 into which outdoor air is introduced and a lower flow path 6 into which indoor air is introduced. The air discharge ports are a defrost vent 16, a face vent 17, a floor vent 18, and a console vent 19.

The air conditioning case 10 includes a defrost door 21 for adjusting the opening degree of the defrost vent 16, a face door 22 for adjusting the opening degree of the face vent 17, a floor door 23 for adjusting the opening degree of the floor vent 18, and a console door 24 for adjusting the opening degree of the console vent 19 therein. A blower unit is provided at an entrance of the air conditioning case 10.

The evaporator 2 and the heater core 3 are sequentially installed in an air flow direction at a predetermined interval. The heater core 3 may further include an electric heater 4 downstream from the heater core 3 in the air flow direction. The air flow path of the air conditioning case 10 is divided into an upper flow path 5 and a lower flow path 6 by a partition wall 50.

The upper flow path 5 includes a first temperature door 11 for adjusting an amount of air passing the heater core 3 and an amount of air bypassing the heater core 3, and the lower flow path 6 includes a second temperature door 12 for adjusting an amount of air passing the heater core 3 and an amount of air bypassing the heater core 3. The upper flow path 5 and the lower flow path 6 are configured to communicate with each other, and the floor door 23 opens and closes a communication path between the upper flow path 5 and the lower flow path 6.

FIG. 2 is a perspective view illustrating an upper part of the conventional air conditioning case. Referring to FIG. 2, the face vent 17 of the conventional two-layer air conditioner for a vehicle includes a center vent 17a blowing air toward the center of a passenger, and a side vent 17b blowing air toward the side of the passenger. The center vent 17a is opened and closed by a center vent door 22a, and the side vent 17b is opened and closed by a side vent door 22b.

The conventional two-layer air conditioner for a vehicle has a disadvantage in that there occurs a right and left temperature difference since temperature of an outlet of the side vent 17b gets higher than that of the center vent 17a when cold air and warm air are mixed in a vent mode. In order to solve the disadvantage, if a baffle is formed at the side vent 17b to reduce the amount of warm air, temperature of the center vent 17a is relatively higher in a bi-level mode.

DISCLOSURE

Technical Problem

Accordingly, the present invention has been made in view of the above-mentioned problems occurring in the related art, and it is an object of the present invention to provide an air conditioner for a vehicle capable of simultaneously reducing a right and left temperature difference of a center vent and a side vent in a bi-level mode as well as in a vent mode.

Technical Solution

To accomplish the above-mentioned objects, according to the present invention, there is provided an air conditioner for a vehicle, which includes an air conditioning case having a plurality of air discharge ports, and a cooling heat exchanger and a heating heat exchanger sequentially formed in an air flow path of the air conditioning case, wherein the air discharge ports include a face vent having center vents and side vents. The air conditioner further includes: a right and left temperature difference reducing means which reduces a cross-sectional area of the flow path discharging air to the side vents in a first air conditioning mode and reduces a cross-sectional area of the flow path discharging air to the center vents in a second air conditioning mode so as to reduce a right and left temperature difference between a center vent outlet and a side vent outlet.

The right and left temperature difference reducing means includes: a second baffle blocking a portion of a flow path of the center vent; and a first baffle blocking a portion of a flow path of the side vent.

Moreover, the first baffle in a vent mode reduces the cross-sectional area of the flow path close to a warm air flow path among the side vent outlets, and the second baffle in the bi-level mode reduces the cross-sectional area of the flow path close to the warm air flow path among the center vent outlets.

Furthermore, the cross-sectional area of the warm air flow path of the center vent in the vent mode is wider than the cross-sectional area of the warm air flow path of the side vent, and wherein the cross-sectional area of the warm air flow path of the center in the bi-level mode is narrower than the cross-sectional area of the warm air flow path of the side vent.

The first baffle is formed upstream from the second baffle in the air flow direction.

The air conditioner for a vehicle further includes a vent door for adjusting the opening degree of the face vent, wherein the first baffle is formed to protrude above a door seating portion, which is a sealing surface of the air conditioning case, when the vent door 122 is closed.

The first baffle has a protruding length greater than the second baffle.

The second baffle has the same protruding length as the door seating portion 191, and has a length that the second baffle 220 does not get in contact with the vent door.

The air conditioner for a vehicle further includes a vent door for adjusting the opening degree of the face vent, wherein the vent door in the vent mode is rotatably controlled to open a flow path of the face vent, and one end of the vent door in the bi-level mode is rotatably controlled to face the second baffle.

The first baffle and the second baffle extend from the inner wall of the rear end of the air conditioning case, which is opposed to the defrost vent, to the front in a transverse direction.

The vent door includes a flat plate part extending in a radial direction around a rotary shaft, and the first baffle is formed at a height corresponding to the rotary shaft of the vent door.

The air flow path of the air conditioning case has a two-layer structure in which an upper flow path through which outside air flows and a lower flow path through which inner air flows are separated from each other, and the upper flow path and the lower flow path communicate with each other such that the air of the lower flow path rises to the upper flow path and is discharged through the face vent.

The air conditioner for a vehicle further includes a vent door for adjusting the opening degree of the face vent, wherein a rotational angle of the vent door in the bi-level mode further closes a flow path of the face vent than that in the vent mode.

The first baffle and the second baffle are arranged at a position extending upward from the communication path between the upper flow path and the lower flow path.

Advantageous Effects

The air conditioner for a vehicle according to the present invention can optimize positions of the first baffle and the second baffle in order to effectively solve the problem of the right and left temperature difference in the bi-level mode as well as in the vent mode, thereby providing air-conditioning air of uniform and stable discharge temperature to a passenger in various air conditioning modes, and increasing reliability in temperature control.

MODE FOR INVENTION

Figure 1:
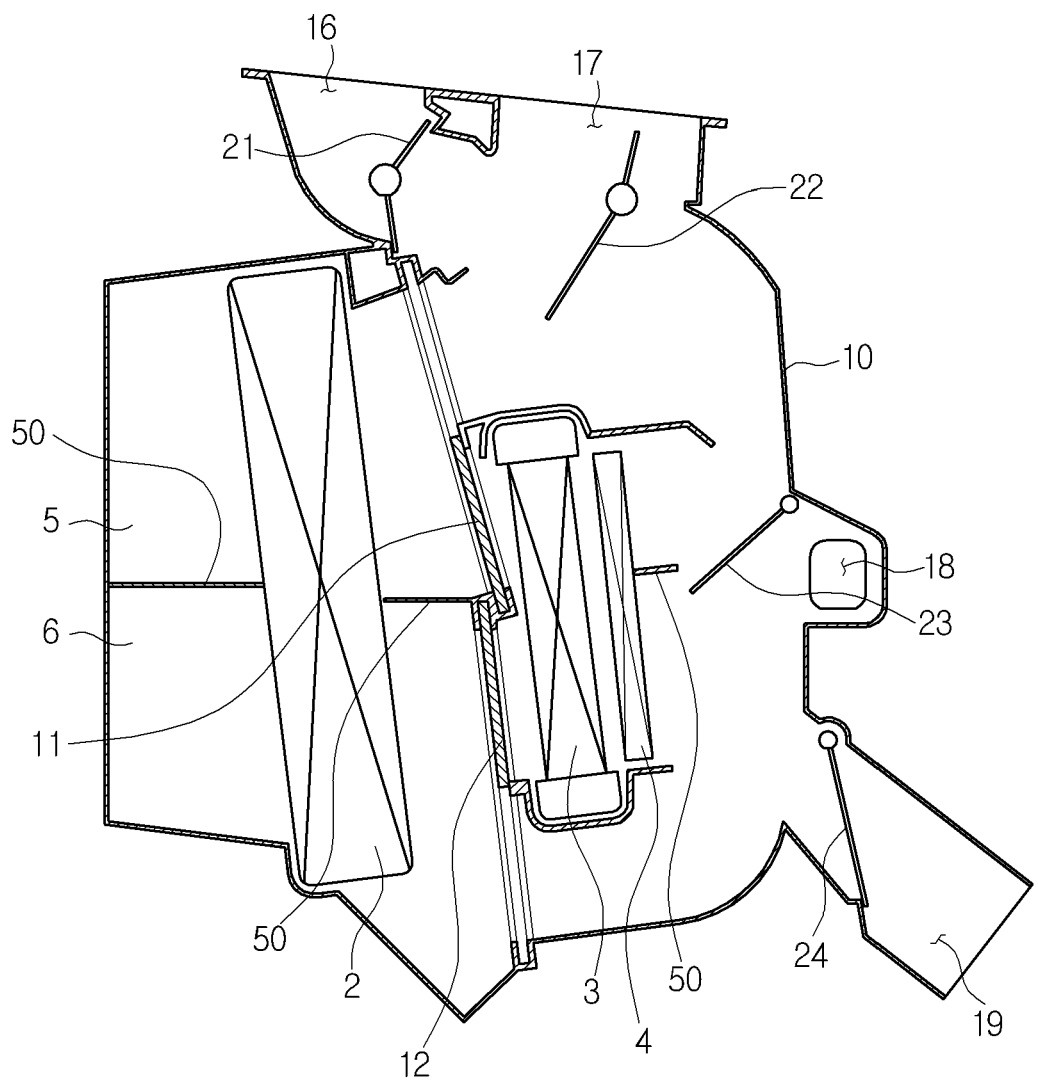
FIG. 1 is a cross-sectional view illustrating a conventional two-layer air conditioner for a vehicle.
Figure 2:
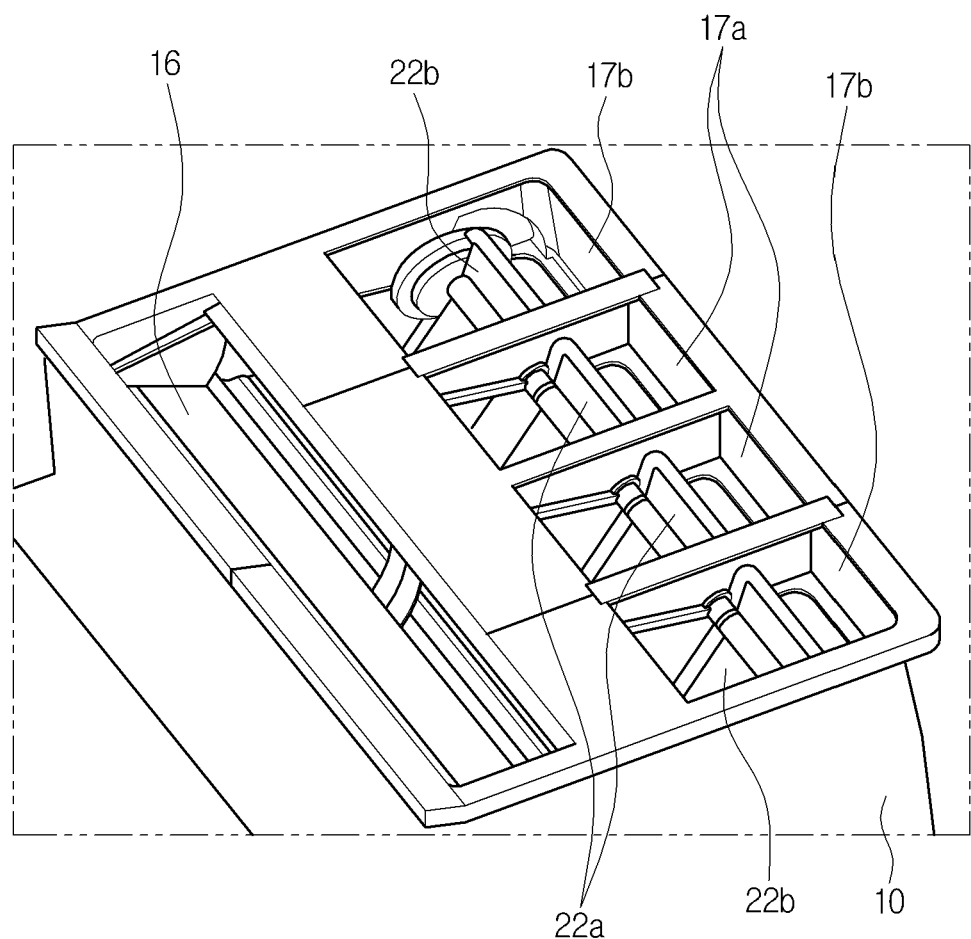
FIG. 2 is a perspective view illustrating an upper part of an air conditioning case of the conventional air conditioner.
Figure 3:
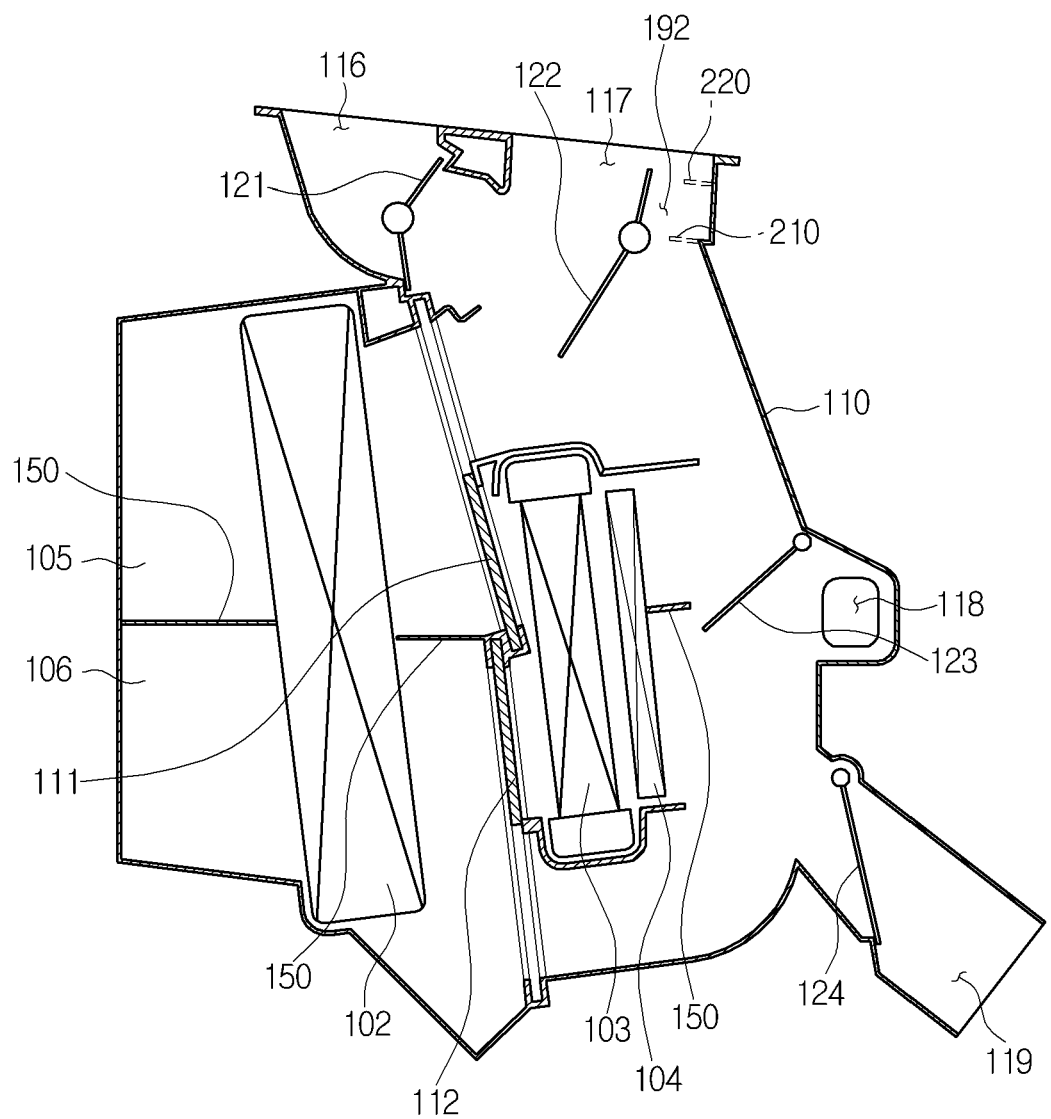
FIG. 3 is a cross-sectional view illustrating an air conditioner for a vehicle according to an embodiment of the present invention.
Figure 4:
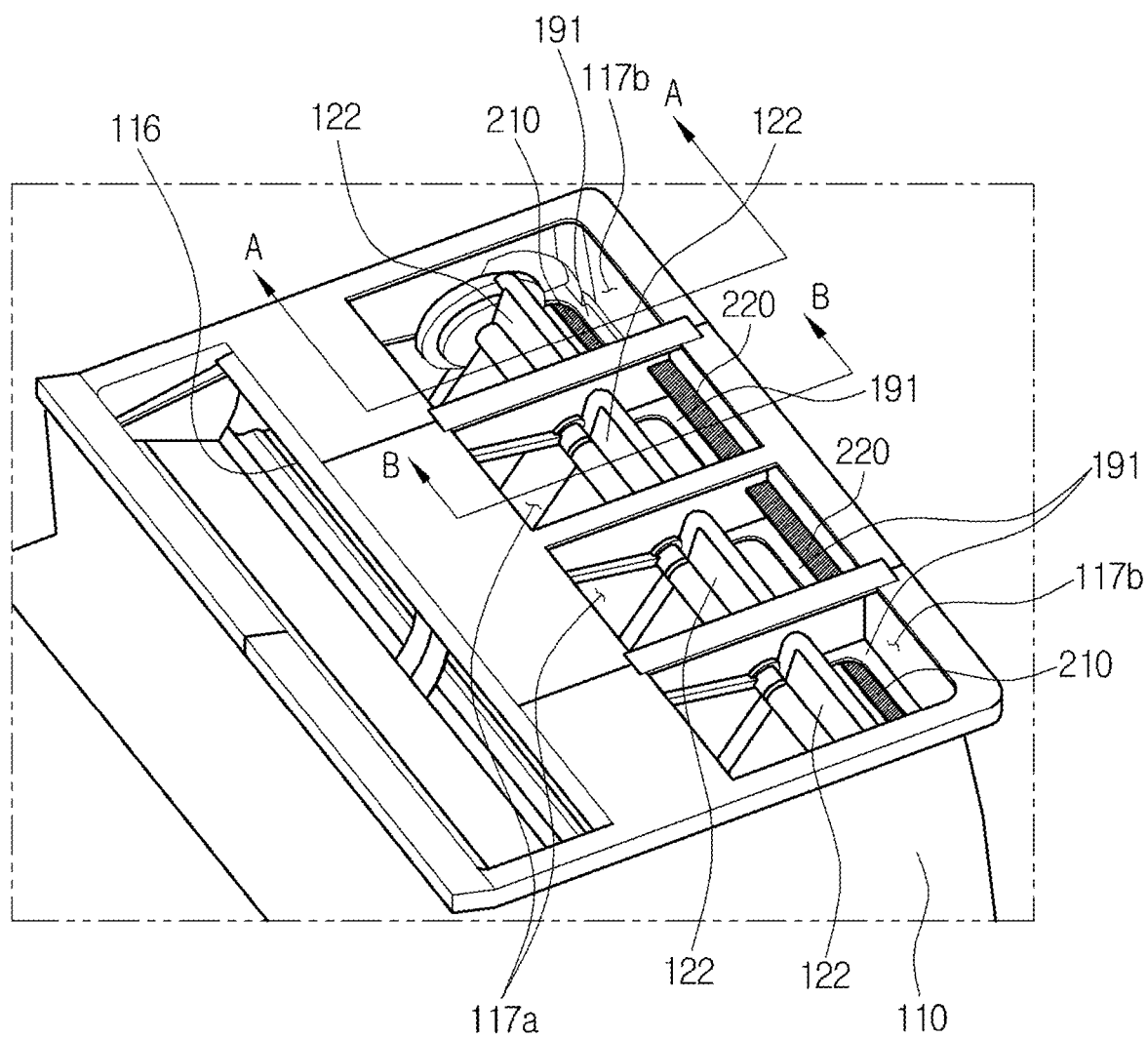
FIG. 4 is a perspective view illustrating an upper part of an air conditioning case according to an embodiment of the present invention.
Figure 5:
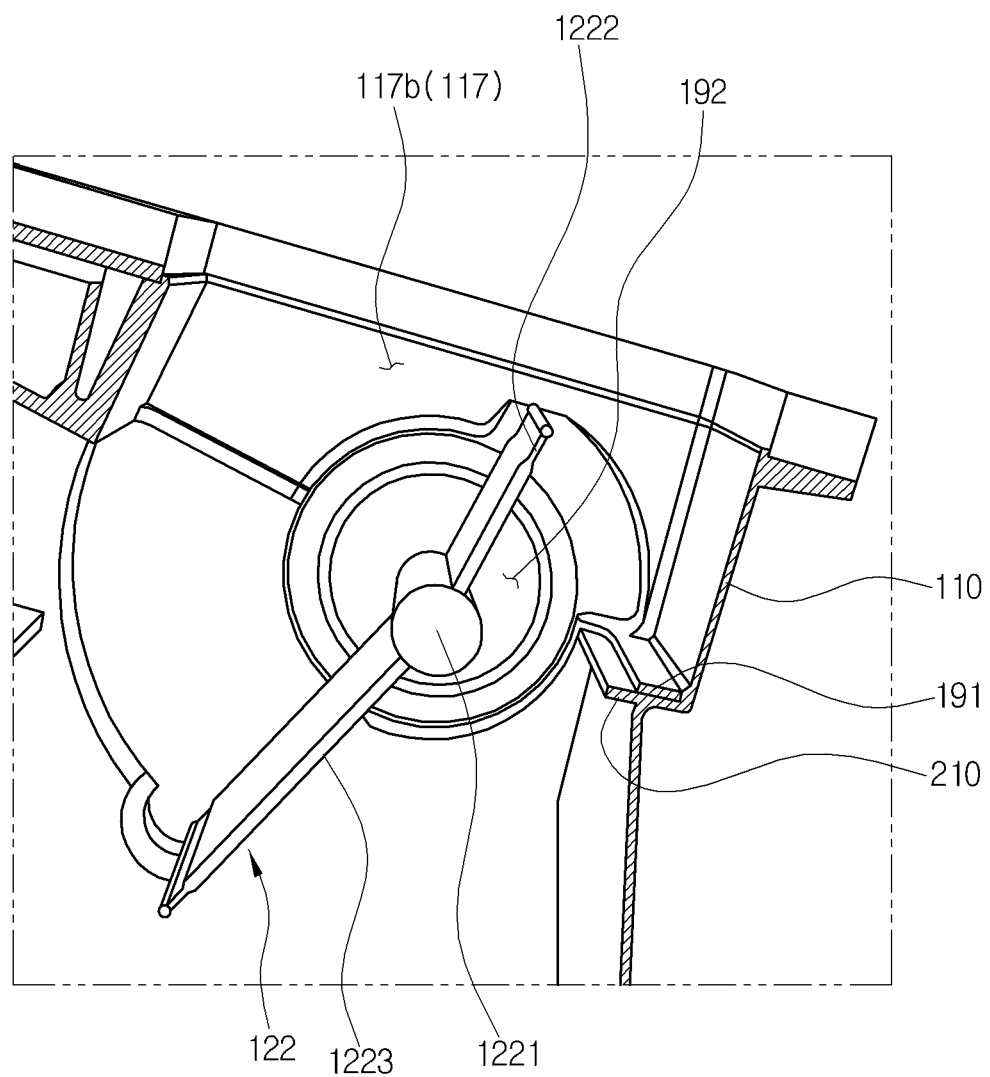
FIG. 5 is a partial perspective view taken along line A-A of FIG. 4.
Figure 6:
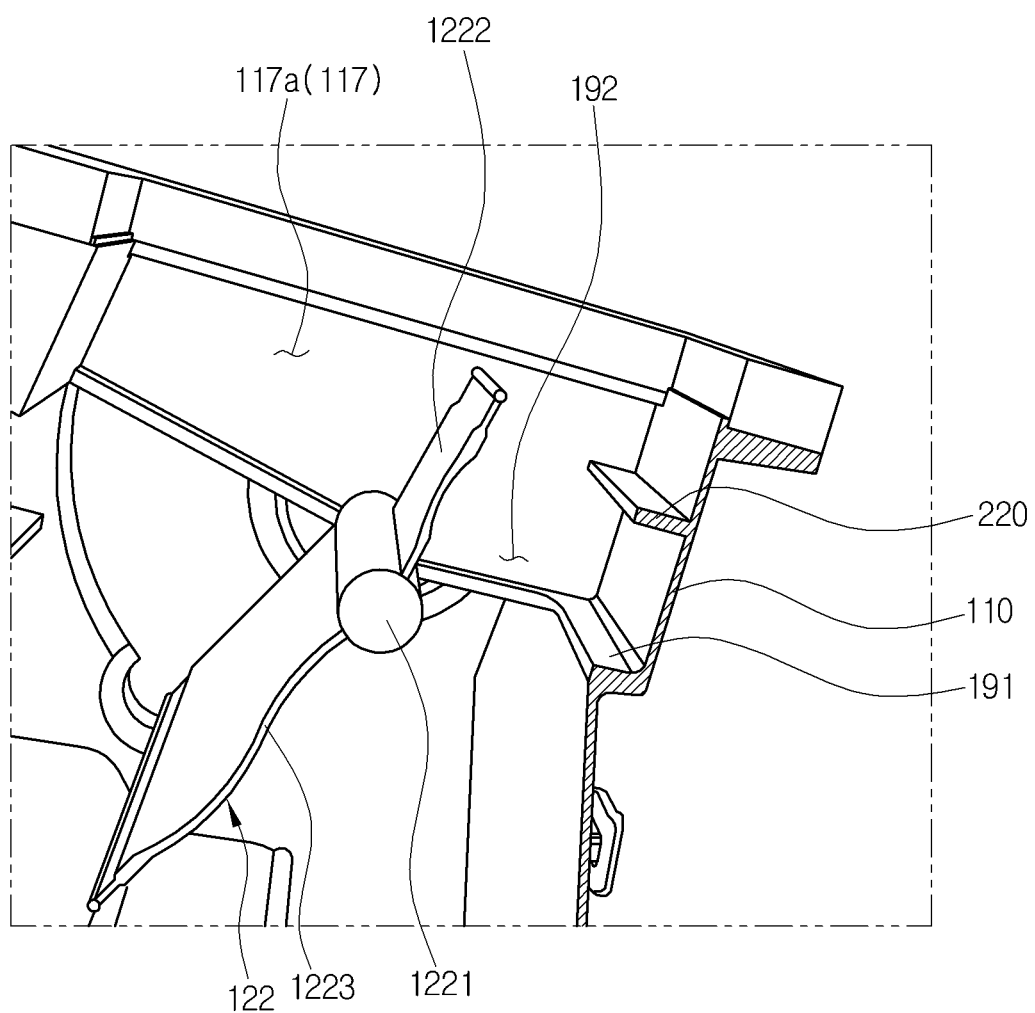
FIG. 6 is a partial perspective view taken along line B-B of FIG. 4.
Figure 7:
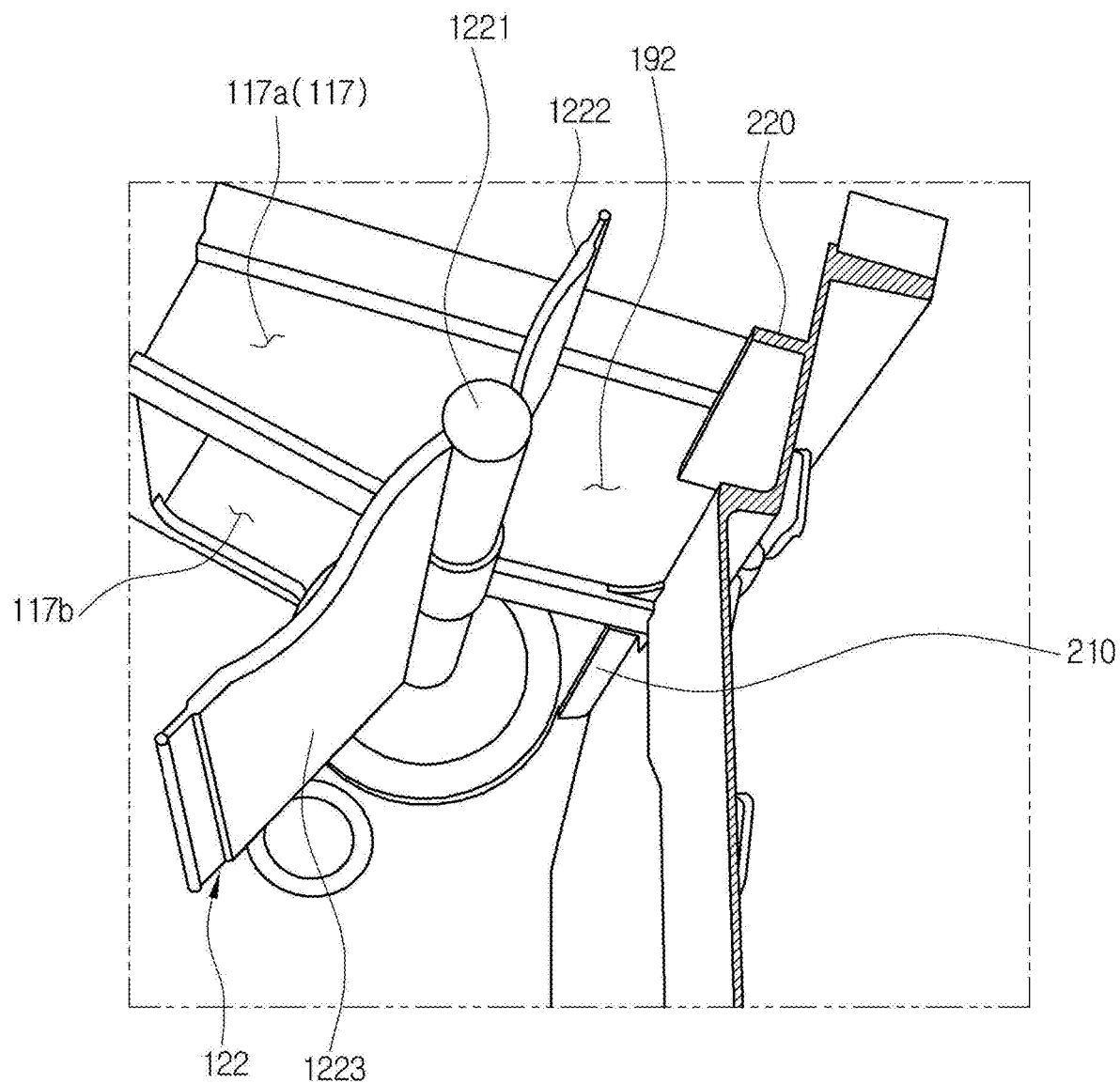
FIG. 7 is a bottom perspective view illustrating the inside of the air conditioning case according to an embodiment of the present invention.

Hereinafter, a technical configuration of an air conditioner for a vehicle according to the present invention will be described in detail.

Referring to FIGS. 3 to 7, a two-layer air conditioner for a vehicle according to an embodiment of the present invention has a two-layer structure that an upper flow path 105 through which outdoor air is introduced and a lower flow path 106 through which indoor air is introduced are separated from each other. The air conditioner includes an air conditioning case 110, a cooling heat exchanger, and a heating heat exchanger.

An air flow path of a predetermined shape is formed in the air conditioning case 110, an air inlet is formed at an entrance of the air flow path, and a plurality of air discharge ports are formed at an exit of the air flow path. The air flow path includes an upper flow path 105 and a lower flow path 106. The air discharge ports are a defrost vent 116, a face vent 117, a floor vent 118, and a console vent 119.

The air conditioning case 110 includes: a defrost door 121 for adjusting the opening degree of the defrost vent 116; a vent door 122 for adjusting the opening degree of the face vent 117; a floor door 123 for adjusting the opening degree of the floor vent 118; and a console door 124 for adjusting the opening degree of the console vent 119. A blower unit is provided at an entrance of the air conditioning case 110.

A cooling heat exchanger and a heating heat exchanger are arranged in sequence on the air flow path of the air conditioning case 110 to exchange heat with air passing through the heat exchangers. The cooling heat exchanger includes an evaporator 102, and the heating heat exchanger includes a heater core 103. The heating heat exchanger may further include an electric heater 104 downstream from the heater core 103 in an air flow direction. The evaporator 102 and the heater core 103 are sequentially installed in the air flow direction at a predetermined interval.

The air flow path of the air conditioning case 110 is divided into an upper flow path 105 and a lower flow path 106 by a partition wall 150. The indoor air introduced into an indoor air inlet flows into the lower flow path 106, and the outdoor air introduced into an outdoor air inlet flows to the upper flow path 105. The partition wall 150 extends upstream from the evaporator 102, between the evaporator 102 and the heater core 103, and downstream from the heater core 103 and the electric heater 104.

The evaporator 102 and the heater core 103 are provided over the upper flow path 105 and the lower flow path 106. The upper flow path 105 includes a first temperature door 111 for adjusting an amount of air passing the heater core 103 and an amount of air bypassing the heater core 103, and a second temperature door 112 for adjusting an amount of air passing the heater core 103 and an amount of air bypassing the heater core 103.

The upper flow path 105 includes an upper cold air flow path and an upper warm air flow path, and the lower flow path 106 includes a lower warm air flow path and a lower cold air flow path. The upper cold air flow path, the upper warm air flow path, the lower warm air flow path, and the lower cold air flow path are sequentially formed from the top to the bottom. A defrost vent 116 and a face vent 117 are provided in the upper flow path 105, and a floor vent 118 is provided in the lower flow path 106.

The upper flow path 105 and the lower flow path 106 are configured to communicate with each other, and the floor door 123 opens and closes the communication path between the upper flow path 105 and the lower flow path 106. When the communication path of the upper flow path 105 and the lower flow path 106 is open, the air of the lower flow path 106 rises to the upper flow path 105 and is discharged through the face vent 117.

The floor door 123 is disposed on the rear surface of the heater core 103, and more specifically, on the rear surface of the heat transfer heater 104 to face the heater core 103. The floor door 123 gets in contact with the partition wall 150 located at the rear end of the heater core 103 and the electric heater 104 to close the communication path between the upper flow path 105 and the lower flow path 106 when rotating in the clockwise direction to the maximum. In the case that the floor door 123 rotates in the clockwise direction to the maximum, the floor door 123 gets in contact with the partition wall 150 located at the rear end of the heater core 103 and the electric heater 104 to serve as a partition wall for partitioning the upper flow path 105 and the lower flow path 106. When the floor door 123 rotates in the counterclockwise direction, the floor vent 118 is closed, and the upper flow path 105 and the lower flow path 106 communicate with each other.

The face vent 117 includes center vents 117a for blowing air toward the center of the passenger, and side vents 117b for blowing air toward the side of the passenger. The center vents 117a and the side vents 117b for adjusting the opening degree of the face vent 117 are opened and closed by the vent door 122. The side vents 117b are disposed at both right and left edges of the air conditioning case in the width direction of the vehicle, and the center vents 117a are disposed at the center of the air conditioning case between the side vents 117b in the width direction of the vehicle.

The two-layer air conditioner for a vehicle according to an embodiment of the present invention includes a right and left temperature difference reducing means. The right and left temperature difference reducing means reduces a cross-sectional area of the flow path toward the side vent 117b in a first air conditioning mode and reduces a cross-sectional area of the flow path toward the center vent 117a in a second air conditioning mode. As a result, the right and left temperature difference reducing means functions to reduce the temperature difference between outlets of the center vents 117a and outlets of the side vents 117b.

The right and left temperature difference reducing means includes a first baffle 210 and a second baffle 220. The first baffle 210 is provided in the side vent 117b and is formed to block a portion of the flow path of the side vent. The second baffle 220 is provided in the center vent 117a and is formed to block a portion of the flow path of the center vent. The first baffle 210 and the second baffle 220 protrude from the inner wall of the air conditioning case 110 toward the air flow path.

Meanwhile, the vent door 122 includes a rotary shaft 1221 and flat plate parts 1222 and 1223. The flat plate parts 1222 and 1223 extend radially around the rotary shaft 1221. That is, the vent door 122 is formed in such a manner that the flat plate parts 122 and 1223 are extended to both sides around the rotary shaft 1221. When the vent door 122 opens the face vent 117 to the maximum, the flat plate parts 1222 and 1223 are positioned approximately in the vertical direction, and when the vent door 122 closes the face vent 117, the flat plate parts 1222 and 1223 are positioned approximately in the transverse direction.

The first baffle 210 is formed upstream from the second baffle 220 in the air flow direction. That is, the first baffle 210 is formed below the second baffle 220, and the second baffle 220 is positioned at the rear end of the discharge port, and the first baffle 210 is positioned at the front end of the discharge port. Moreover, the first baffle 210 is formed at a height corresponding to the rotary shaft 1221 of the vent door 122.

More specifically, the first baffle 210 and the second baffle 220 extend in a transverse direction from the inner wall of the rear end of the air conditioning case 110, which is opposed to the defrost vent 116, toward the front. The defrost vent 116 is located in front of the air conditioning case 110, and the face vent 117 is located at the rear of the air conditioning case 110 in the back-and-forth direction of the vehicle.

The first baffle 210 and the second baffle 220 extend in the transverse direction from the inner wall of the rear end of the air conditioning case 110 toward the front, thereby effectively reducing the amount of warm air rising after passing through the heater core 103 and the heat transfer heater 104.

In a vent mode, the first baffle 210 limits the amount of warm air discharged through the side vent 117b. Furthermore, in a bi-level mode, the second baffle 220 limits the amount of warm air discharged through the center vent 117a.

More specifically, in the vent mode, the first baffle 210 reduces the cross-sectional area of the flow path 192 close to the warm air path among the outlets of the side vents 117b, and in the bi-level mode, the second baffle 220 reduces the cross-sectional area of the flow path 192 close to the warm air flow path among the outlets of the center vents 117a. That is, in the vent mode, the cross-sectional area of the warm air flow path of the side vent 117b is narrower than that of the warm air flow path of the center vent 117a, and the cross-sectional area of the warm air flow path of the side vent 117b in the bi-level mode is wider than that of the warm air flow path of the center vent 117a.

Figure 8:
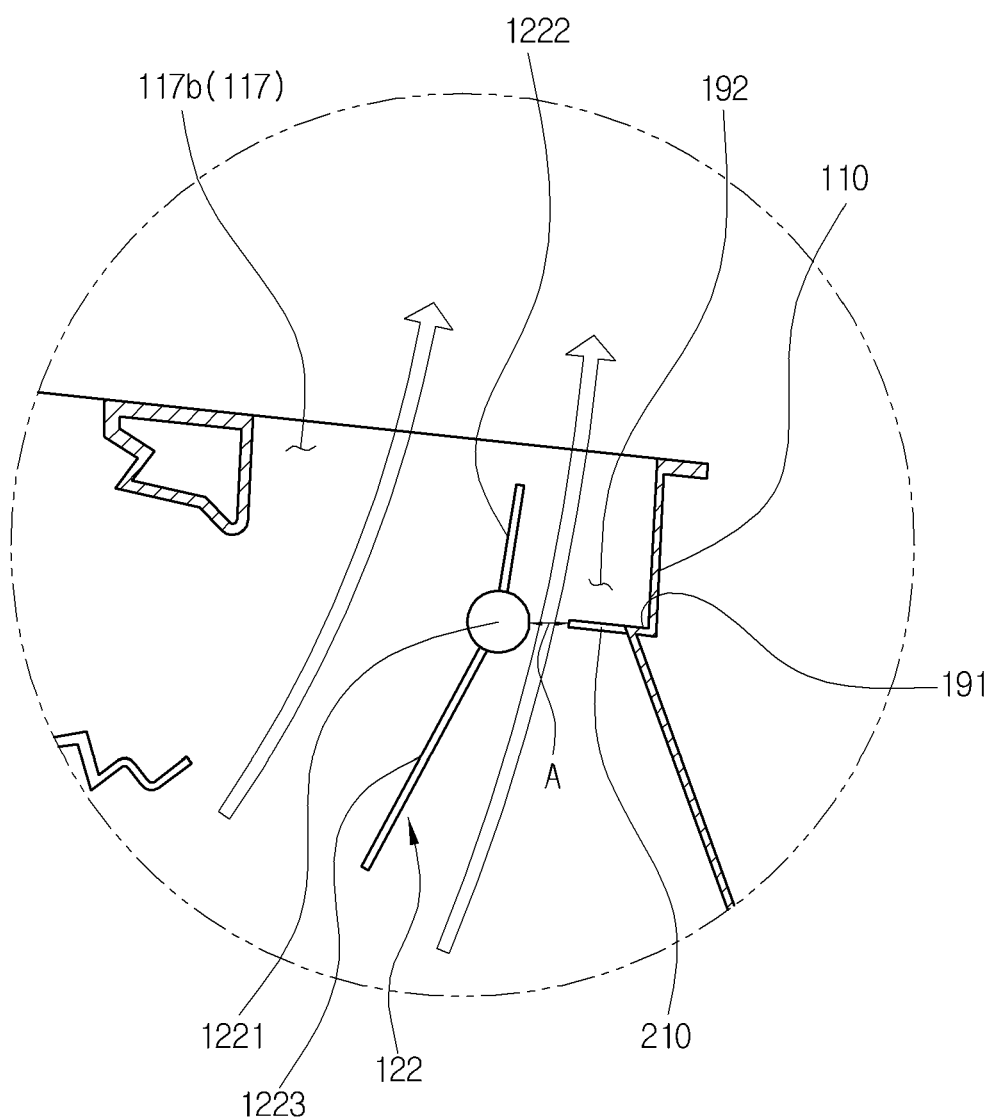
FIG. 8 is a cross-sectional view illustrating a side vent in a vent mode of the air conditioner according to an embodiment of the present invention.
Figure 9:
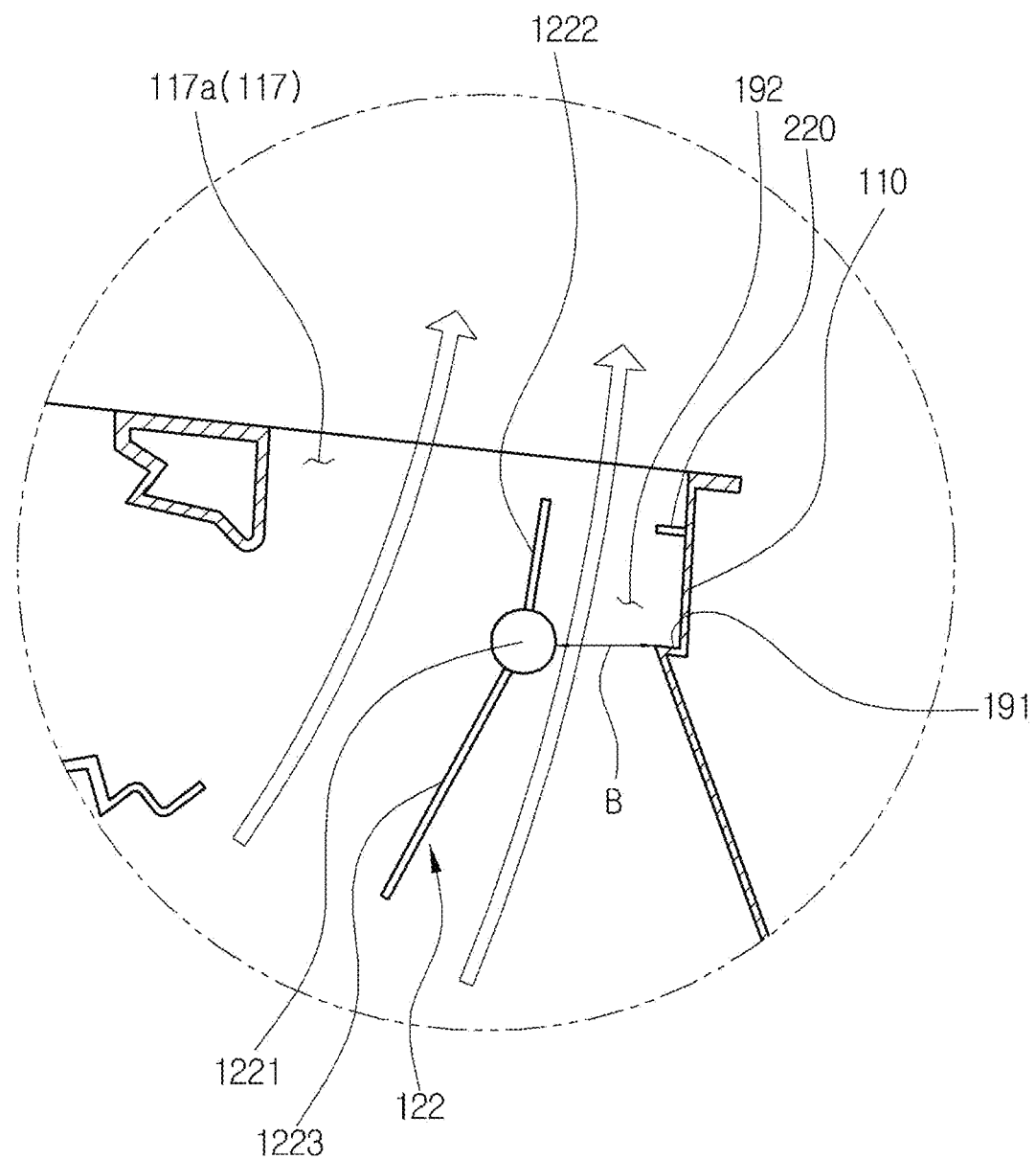
FIG. 9 is a cross-sectional view illustrating a center vent in the vent mode of the air conditioner according to an embodiment of the present invention.

Referring to FIGS. 8 and 9, in the vent mode, the first baffle 210 reduces the width of the flow path 192 close to the warm air path among the outlets of the side vents 117b. That is, a width B of the warm air flow path of the center vent 117a in the width direction of the vehicle is wider than a width A of the side vent 117b at both sides in the width direction of the vehicle (B>A). Through such a configuration, the temperature difference between the center vents 117a and the side vents 117b may be reduced in the vent mode.

Figure 10:
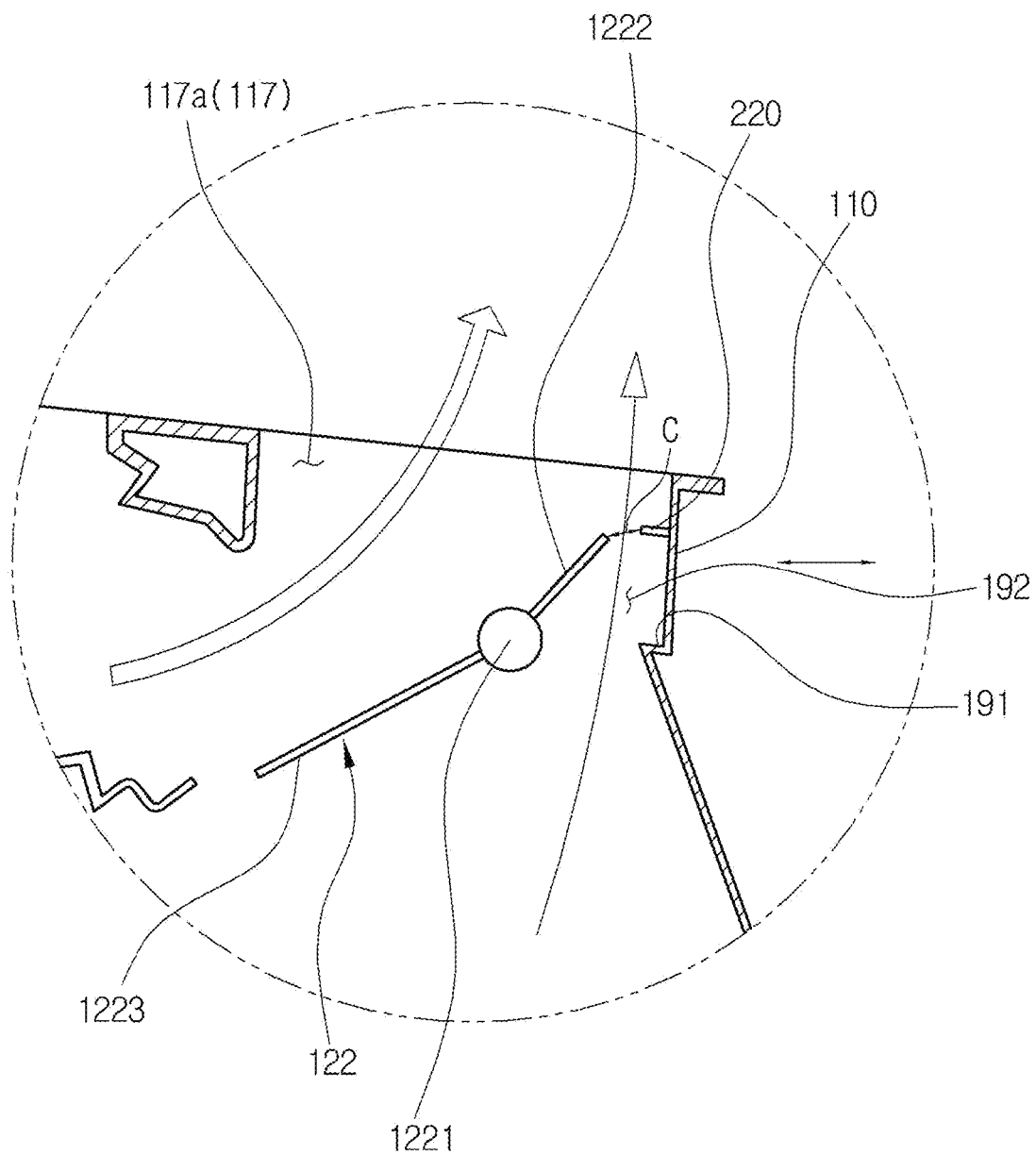
FIG. 10 is a cross-sectional view illustrating a center vent in a bi-level mode of the air conditioner according to an embodiment of the present invention.
Figure 11:
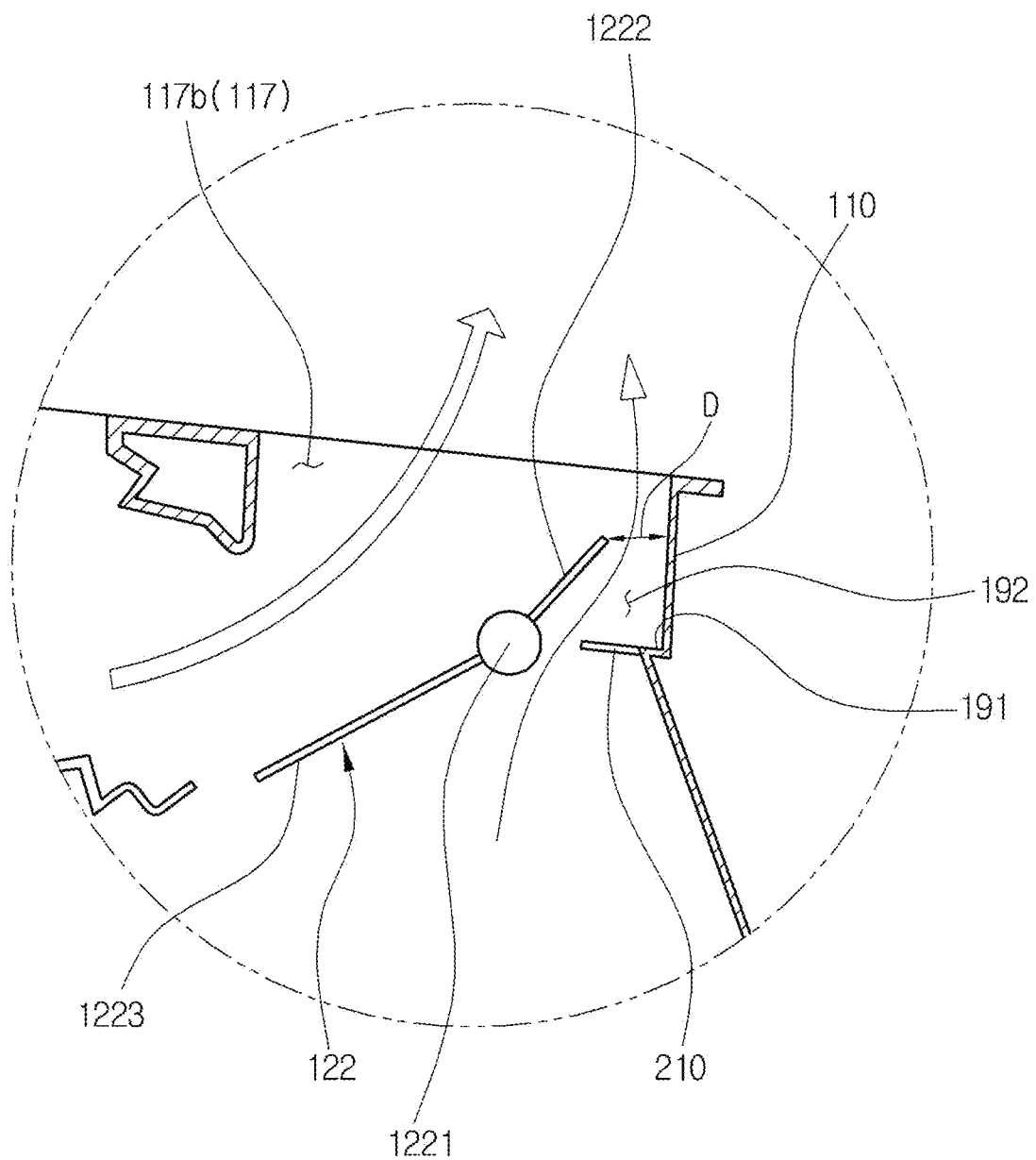
FIG. 11 is a cross-sectional view illustrating a side vent in the bi-level mode of the air conditioner according to an embodiment of the present invention.

Referring to FIGS. 10 and 11, in the bi-level mode, the second baffle 220 reduces the width of the flow path 192 close to the warm air path among the outlets of the center vents 117a. That is, a width C of the warm air flow path of the center vent 117a in the width direction of the vehicle is narrower than the width D of the side vent 117b at both sides in the width direction of the vehicle (D>C). Through such a configuration, the temperature difference between the center vent 117a and the side vent 117b may be reduced in the bi-level mode.

That is, a rotational angle of the vent door 122 in the bi-level mode further closes the flow path 117 than the vent door 122 in the vent mode. In the vent mode, the vent door 122 is rotatably controlled to open the flow path of the face vent 117, and one end of the vent door 122 is controlled to face the second baffle 220 in the bi-level mode.

In the vent mode, the air discharged to the side vent 117b is higher in temperature than the air discharged to the center vent 117a. The first baffle 210 partially blocks the warm air moving upward to reduce the amount of warm air toward the side vent 117b, thereby relatively lowering the discharge temperature of the side vent 117b. In this instance, when only the first baffle 210 is provided, warm air is further discharged to the center vent 117a by the first baffle 210 in the bi-level mode to increase the right and left temperature difference.

To solve the above-mentioned problem, as the second baffle 220 is provided to the center vent 117a, the amount of warm air discharged to the center vent 117a in the bi-level mode can be reduced, thereby lowering the discharge temperature of the center vent 117a. In this instance, the second baffle 220 has little influence on the flow of the air discharged to the center vent 117a in the vent mode so as not to have any influence on the right and left temperature difference.

As described above, the first baffle 210 and the second baffle 220 are respectively provided to the side vent 117b and the center vent 117a, and are respectively positioned at the front end and the rear end of the discharge port, thereby simultaneously solving the problem of the right and left temperature difference in the bi-level mode as well as the vent mode.

In addition, the first baffle 210 protrudes over a door seating portion 191, which is a sealing surface of the air conditioning case 110, when the vent door 122 is closed. Furthermore, the first baffle 210 is greater in protruding length than the second baffle 220. As described above, the rotation angle of the vent door 122 in the bi-level mode is rotatably controlled to further close the flow path of the face vent 117 than the vent door in the vent mode.

Meanwhile, the second baffle 220 has the same protruding length as the door seating portion 191, and has a length that the second baffle 220 does not get in contact with the vent door 122. That is, the second baffle 220 does not get in contact with the vent door 122 when the vent door 122 closes the face vent 117 in the bi-level mode, and a fine gap is formed between the vent door 122 and the second baffle 220.

Through such a configuration, the first baffle 210 located at the height of the rotary shaft 1221 of the vent door 122 can effectively reduce the amount of warm air rising in the vent mode. The second baffle 220 located at the height of the flat plate part 1222 of the vent door 122 and facing the flat plate portion 1222 can significantly reduce the amount of warm air rising in the bi-level mode without affecting the flow of air in the vent mode.

In addition, the first baffle 210 and the second baffle 220 are arranged at a position extending upward from the communication path between the upper flow path 105 and the lower flow path 106. Through such a configuration, when the communication path between the upper flow path 105 and the lower flow path 106 is open, the warm air through the lower flow path 106 as well as the warm air through the upper flow path 105 is blocked by the first baffle 210 or the second baffle 220 to effectively reduce the right and left temperature difference.

Now, an operation example of the present invention will be described. In the vent mode, the first temperature door 111 opens the upper warm air flow path and the upper cold air flow path. The second temperature door 112 opens the lower warm air flow path and the lower cold air flow path. The floor door 123 closes the floor vent 118. The cold air of the upper flow path 105 passing through the evaporator 102 and bypassing the heater core 103 and the electric heater 104 and the warm air of the upper flow path 105 passing through the heater core 103 and the electric heater 104 are discharged through the face vent 117.

Additionally, some of the cold air of the lower flow path 106 passing through the evaporator 102 and bypassing the heater core 103 and the heat transfer heater 104 is discharged through the console vent 119, and the cold air and the warm air of the lower flow path 106 passing through the heater core 103 and the electric heater 104 move to the upper flow path 105 through the communication path between the upper flow path 105 and the lower flow path 106 and are discharged through the face vent 117. The floor door 123 opens the communication path between the upper flow path 105 and the lower flow path 106.

In this instance, the first baffle 210 reduces the amount of the rising warm air discharged to the side vent 117b, thereby lowering the discharge temperature of the side vent 117b. The second baffle 220 has little influence on the air discharged to the center vent 117a.

In the bi-level mode, the first temperature door 111 opens the upper warm air flow path and the upper cold air flow path. The second temperature door 112 opens the lower warm air flow path and the lower cold air flow path. The floor door 123 opens the floor vent 118. The cold air of the upper flow path 105 passing through the electric heater 104 and the warm air of the upper flow path 105 passing through the heater core 103 and the electric heater 104 are discharged through the face vent 117.

Moreover, some of the cold air of the lower flow path 106 passing through the evaporator 102 and bypassing the heater core 103 and the electric heater 104 is discharged through the console vent 119, and the cold air and the warm air of the lower flow path 106 passing through the heater core 103 and the electric heater 104 move to the upper flow path 105 through the communication path between the upper flow path 105 and the lower flow path 106, and are discharged through the face vent 117.

The floor door 123 opens the communication path between the upper flow path 105 and the lower flow path 106. Some of the air of the lower flow path 106 is discharged to the interior through the floor vent 118, and the other of the air of the lower flow path 106 flows into the upper flow path 105 through the communication path between the upper flow path 105 and the lower flow path 106.

In this instance, the second baffle 220 reduces the amount of the rising warm air discharged to the center vent 117a, thereby lowering the discharge temperature of the center vent 117a. The vent door 122 may greatly reduce the amount of the rising warm air by reducing the width of the flow path since an end portion of one of the flat plate part 1222 is adjacent to an end portion of the second baffle 220.

As described above, the vent door 122 in the bi-level mode is rotatably controlled to further close the face vent 117 than the vent door in the vent mode and optimizes the positions of the first baffle 210 and the second baffle 220, thereby effectively solving the problem of the right and left temperature difference in the bi-level mode as well as the vent mode.

Till now, the air conditioner for a vehicle according to the present invention has been described with reference to the attached drawings, but the embodiments of the present invention as described above are only examples. Therefore, it will be appreciated by those skilled in the art that various modifications and equivalent other embodiments are possible from the present invention. Therefore, the true technical protection scope of the present invention must be determined by the technical idea of the appended claims.

The invention claimed is:

1. An air conditioner for a vehicle, comprising:
   an air conditioning case having a plurality of air discharge ports, and a cooling heat exchanger and a heating heat exchanger sequentially formed in an air flow path of the air conditioning case, wherein the plurality of air discharge ports include a face vent having center vents blowing air toward the center of a passenger and side vents blowing air toward the side of a passenger
   a first baffle provided in the side vents and configured to block a portion of a flow path of the side vents; and
   a second baffle provided in the center vents and configured to block a portion of a flow path of the center vents,
   wherein the first baffle is positioned at a front end of at least one of the plurality of discharge ports, and the second baffle is positioned at a rear end of at least one of the plurality of discharge ports.

2. The air conditioner according to claim 1, wherein the first baffle in a vent mode is configured to reduce the cross-sectional area of the flow path close to a warm air flow path among the side vents, and the second baffle in a bi-level mode is configured to reduce the cross-sectional area of the flow path close to a warm air flow path among the center vents.

3. The air conditioner according to claim 2, wherein the cross-sectional area of the warm air flow path of the center vents in the vent mode is wider than the cross-sectional area of the warm air flow path of the side vents, and wherein the cross-sectional area of the warm air flow path of the center vents in a bi-level mode is narrower than the cross-sectional area of the warm air flow path of the side vents.

4. The air conditioner according to claim 1, wherein the first baffle is formed adjacent to the second baffle.

5. An air conditioner for a vehicle comprising:
   an air conditioning case having a plurality of air discharge ports, and a cooling heat exchanger and a heating heat exchanger sequentially formed in an air flow path of the air conditioning case, wherein the plurality of air discharge ports include a face vent having center vents blowing air toward the center of a passenger and side vents blowing air toward the side of a passenger:
   a first baffle blocking a portion of a flow path of the side vents;
   a second baffle blocking a portion of a flow path of the center vents;
   a vent door for adjusting an opening degree of the face vent,
   wherein the first baffle is formed to protrude above a door seating portion, which is a sealing surface of the air conditioning case, when the vent door is closed.

6. The air conditioner according to claim 5, wherein the first baffle has a length greater than the second baffle.

7. The air conditioner according to claim 5, wherein the second baffle has the same length as the door seating portion, and has a length that the second baffle does not get in contact with the vent door.

8. An air conditioner for a vehicle comprising:
   an air conditioning case having a plurality of air discharge ports, and a cooling heat exchanger and a heating heat exchanger sequentially formed in an air flow path of the air conditioning case, wherein the plurality of air discharge ports include a face vent having center vents blowing air toward the center of a passenger and side vents blowing air toward the side of a passenger:
   a first baffle blocking a portion of a flow path of the side vents;
   a second baffle blocking a portion of a flow path of the center vents;
   a vent door for adjusting an opening degree of the face vent,
   wherein the vent door in a vent mode is rotatably controlled to open a flow path of the face vent, and one end of the vent door in a bi-level mode is rotatably controlled to face the second baffle.

9. The air conditioner according to claim 1, wherein the first baffle and the second baffle extend from an inner wall of a rear end of the air conditioning case, which is opposed to a defrost vent, to the front in a transverse direction.

10. The air conditioner according to claim 5, wherein the vent door includes a flat plate part extending in a radial direction around a rotary shaft, and the first baffle is formed at a height corresponding to the rotary shaft of the vent door.

11. The air conditioner according to claim 1, wherein the air flow path of the air conditioning case has a two-layer structure in which an upper flow path through which outside air flows and a lower flow path through which inner air flows are separated from each other, and the upper flow path and the lower flow path communicate with each other such that the air of the lower flow path rises to the upper flow path and is discharged through the face vent.

12. The air conditioner according to claim 1, further comprising:
   a vent door for adjusting an opening degree of the face vent,
   wherein a rotational angle of the vent door in a bi-level mode further closes a flow path of the face vent than that in a vent mode.

13. The air conditioner according to claim 11, wherein the first baffle and the second baffle are arranged at a position extending upward from a communication path between the upper flow path and the lower flow path.

* * * * *